(12) United States Patent
Bhatia (10) Patent No.: US 9,056,982 B2
(45) Date of Patent: Jun. 16, 2015

(54) THERMOPLASTIC COMPOSITION FOR USE IN HIGH IMPACT APPLICATIONS

(71) Applicant: Rajeev S. Bhatia, Hixson, TN (US)

(72) Inventor: Rajeev S. Bhatia, Hixson, TN (US)

(73) Assignee: INVISTA NORTH AMERICA S.A.R.L., Wilmington, DE (US)

( * ) Notice: Subject to any disclaimer, the term of this patent is extended or adjusted under 35 U.S.C. 154(b) by 0 days.

(21) Appl. No.: 13/950,722

(22) Filed: Jul. 25, 2013

(65) Prior Publication Data
US 2014/0031476 A1     Jan. 30, 2014

Related U.S. Application Data

(60) Provisional application No. 61/675,990, filed on Jul. 26, 2012, provisional application No. 61/737,481, filed on Dec. 14, 2012.

(51) Int. Cl.
| | |
|---|---|
| *C08L 83/00* | (2006.01) |
| *C08L 77/06* | (2006.01) |
| *C08L 77/00* | (2006.01) |

(52) U.S. Cl.
CPC ..... *C08L 77/06* (2013.01); *C08L 77/00* (2013.01)

(58) Field of Classification Search
CPC ................................. C08L 77/06; C08L 83/04
USPC ................................................. 524/506, 413
See application file for complete search history.

(56) References Cited

U.S. PATENT DOCUMENTS

| | | | |
|---|---|---|---|
| 4,321,336 A * | 3/1982 | Meyer et al. ............ | 525/183 |
| 4,346,194 A | 8/1982 | Roura | |
| 5,610,223 A | 3/1997 | Mason | |
| 5,670,575 A | 9/1997 | Flexman, Jr. | |
| 6,281,256 B1 | 8/2001 | Harris et al. | |
| 6,362,288 B1 | 3/2002 | Brewer et al. | |
| 6,569,955 B1 | 5/2003 | Brewer et al. | |
| 6,579,581 B2 * | 6/2003 | Bartz et al. ............ | 428/34.7 |
| 7,671,127 B2 | 3/2010 | Weber et al. | |
| 2011/0152459 A1 | 6/2011 | Berg | |
| 2012/0022194 A1 * | 1/2012 | Bayer et al. ............ | 524/133 |
| 2013/0150517 A1 * | 6/2013 | Tarbit et al. ............ | 524/502 |

FOREIGN PATENT DOCUMENTS

| | | |
|---|---|---|
| CN | 101550271 | 10/2009 |
| CN | 101 851 417 | 10/2010 |
| CN | 102 321 366 | 1/2012 |
| EP | 0 690 098 A2 | 1/1996 |
| WO | 2012024268 A1 | 2/2012 |

OTHER PUBLICATIONS

"ultra high molecular wight siloxane polymer"—Google Scholar, http://scholar.google.com/scholar; Aug. 18, 2014, 2 pages.

* cited by examiner

*Primary Examiner* — Hui Chin
(74) *Attorney, Agent, or Firm* — Bridget C. Sciamanna (57) ABSTRACT

A thermoplastic composition comprising from about 50 to about 99 by weight percent of a nylon 6,6 resin, from about 1 to about 50 by weight percent of a polymer performance modifier and about from 0.01 to about 25 by weight percent of a silicone based additive, wherein the silicone based additive comprises an ultrahigh molecular weight siloxane polymer that is unfunctionalized and non-reactive with the polyamide resin, wherein the thermoplastic composition has an impact strength value which is greater than the combination of the polyamide resin and the polymer performance modifier or the combination of the polyamide resin and the silicone based additive and wherein the thermoplastic composition has an ultimate tensile strength that is at least 80% that of the combination of the polyamide resin and the polymer performance modifier.

25 Claims, 4 Drawing Sheets

THERMOPLASTIC COMPOSITION FOR USE IN HIGH IMPACT APPLICATIONS

CROSS-REFERENCE TO RELATED APPLICATIONS

This application claims the priority filing dates of U.S. Provisional Application Ser. No. 61/675,990, filed Jul. 26, 2012, and U.S. Provisional Application Ser. No. 61/737,481, filed Dec. 14, 2012, the disclosures of which are specifically incorporated herein by reference in their entireties.

FIELD OF THE INVENTION

This disclosure relates to polyamide compositions with improved impact strength.

BACKGROUND OF THE INVENTION

Nylon polymers are desirable in many applications due to its their outstanding elasticity, dye-fastness and high melting point. Nylon polymers commonly take the form of pellets or flakes, which can be melted and shaped for use in plastic applications; or extruded as fiber for use in yarn applications, such as apparel, carpet, airbags and outdoor gear.

In recent years, nylon resins have been utilized for automotive, electronics, industrial and consumer applications. In order to meet the performance standards for these applications, Nylon resins are commonly enhanced with additives such as impact modifiers and mineral or synthetic reinforcements.

Impact modified nylon compositions are useful for industrial applications because they generally possess good impact strength, stiffness and weld line strength. U.S. Pat. Nos. 4,346,194 and 6,579,581, teach nylon resins with impact modifying components. Common impact modifiers are elastomeric, olefinic copolymers grafted with carboxyl or carboxylate functional groups. It is desirable to have nylon compositions with a high impact strength and stiffness. However, it is well known and understood that improving the impact strength of a polymer composition with commercially available modifiers generally results in a proportional decrease in tensile strength. Due to this inverse relationship, to achieve a significant increase in impact strength for a composition, a corresponding decrease in tensile strength must also be expected. This inverse relationship limited the use of impact modified nylon compositions when tensile strength requirements cannot be met.

Therefore, there is a need for thermoplastic molding compositions that possess increased impact strength and similar tensile strength to the base resin used in the composition.

SUMMARY OF THE INVENTION

The present invention relates to a thermoplastic composition that comprises a polyamide resin, a polymer performance modifier and a silicone based additive. The resulting thermoplastic composition has an impact strength that is greater than the combination of the polyamide resin and polymer performance modifier alone and a tensile strength that is comparable the polyamide resin.

In one embodiment of the present invention the thermoplastic composition comprises from about 25 to about 99 by weight percent of a polyamide resin; from about 1 to about 50 by weight percent of a polymer performance modifier; and about from 0.01 to about 25 by weight percent of a silicone based additive.

In another embodiment, the thermoplastic composition has an impact strength value which is greater than the combination of the polyamide resin and the polymer performance modifier or the combination of the polyamide resin and the silicone based additive. The silicone based additive comprises an ultrahigh molecular weight siloxane polymer which may be unfunctionalized and non-reactive with the polyamide resin. For uniform performance, it may be desirable to evenly distribute the silicone based additive throughout the thermoplastic composition.

In another embodiment, the thermoplastic composition has an ultimate tensile strength that is at least 80% that of the combination of the polyamide resin and the polymer performance modifier.

The polymer performance modifier comprises an elastomeric polyolefinic polymer functionalized with an unsaturated carboxylic acid anhydride.

In another embodiment, the polymer performance modifier comprises a maleic anhydride functionalized elastomeric ethylene copolymer, a maleic anhydride functionalized ethylene,α-olefin copolymer, a terpolymer of ethylene, acrylic ester and maleic anhydride, a maleic anhydride grafted (MAH) polyolefin elastomer and combinations thereof Thermoplastic compositions which are the subject of this discovery may further comprise additives such as lubricants, glass fillers, mineral fillers, plasticizers, pigments, dyes, antioxidants, heat stabilizers, hydrolysis stabilizers, nucleating agents, flame retardants, blowing agents and combinations thereof.

The mineral fillers include but are not limited to kaolin, clay, talc, and wollastonite, diatominte, titanium dioxide, mica, amorphous silica and combinations thereof.

Similarly, the glass fillers are selected from the group consisting of short glass fiber, long glass fiber, continuous glass fiber, glass flakes, glass beads and combinations thereof.

The glass fillers may be hydrolysis resistant glass fibers coated with a sizing composition and organosilane coupling agents depending on the application.

Heat stabilizers are selected from the group consisting of hindered phenols, amine antioxidants, hindered amine light stabilizers (HALS), aryl amines, phosphorus based antioxidants, copper heat stabilizers, polyhydric alcohols, tripentaerythritol, dipentaerythritol, pentaerythritol and combinations thereof.

The polyamide resin may be any polyamide for which impact resistance is desired, including Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 61, Nylon DT, Nylon DI, Nylon 6T/6I, Nylon 6T/DT, Nylon 6/6,6, Nylon DT/DI, Nylon MXD-6 and blends and copolymers thereof.

In another embodiment, the thermoplastic composition further comprises from about 0.1 to about 5.0 by weight of an olefin and maleic anhydride copolymer, wherein the an olefin and maleic anhydride copolymer has a molecular weight in the range of about 300 to about 1,000,000 and the ratio of olefin to maleic anhydride is 1:1. In this embodiment, where the olefin is ethylene, it is possible to produce a shear viscosity greater than 1000 Pa when tested at a shear rate of 100 sec-1. Additionally, it is possible to produce a thermoplastic composition with a shear viscosity that is greater than 2000 Pa when tested at a shear rate of 30 sec-1.

In another embodiment, the polymer performance modifier is present in an amount from about 16% to about 18% by weight and the silicone based additive is present in an amount from about 1.0% to about 5.0% by weight. Notably, when the polymer performance modifier is present in about 16% by weight and the silicone based additive is present in an amount from about 1.0% to about 5.0% by weight, it is possible to realize an impact strength of at least 70 kJ/m2 when tested at room temperature.

In another embodiment, the polymer performance modifier is present in an amount from about 18% to about 22% by weight and the silicone based additive is present in an amount from about 1.0% to about 5.0% by weight, wherein the impact strength is at least 80 kJ/m2 when tested at room temperature.

In another embodiment, the invention provides favorable tensile strength when polymer performance modifier is present at about 16% to about 22% by weight and the silicone based additive is present in an amount from about 1.0% to about 5.0% by weight. It has been found that the tensile strength is at least 20 Mpa at 50% elongation When tested at 100% moisture saturation. Additionally, no break was observed at 200% elongation when tested at 100% moisture saturation.

The thermoplastic compositions may be formed into molded articles useful in fields requiring impact resistance and strength, such as automotive parts. Additional applications include blow molded or injection molded applications, pneumatic duct work, pipes, tubing, chemical containers, gas tanks, fasteners and snap fit parts, hinged parts, gears and bearings, sporting goods, ski bearings, sprinkler heads, driving barrels, microcellular foam processing, lawn mower parts or appliances.

Also provided is a process for forming the thermoplastic composition comprising the steps of adding a polymer performance modifier and a silicone based additive to a polyamide resin and then mixing the polymer modifier, silicone based additive and polyamide resin together to form a high impact polymer.

Further provided is a process for increasing the impact strength in a polymer comprising the steps of: adding a polymer performance modifier and a silicone based additive comprising an ultrahigh molecular weight siloxane polymer to a polyamide resin and mixing the polymer modifier, silicone based additive and polyamide resin to form a high impact polymer, which exhibits an ultimate tensile strength of at least 80% that of the tensile strength of the combination of the polyamide resin with the polymer modifier. The polymer performance modifier of this process comprises an impact modifier that may be selected from a group consisting of a maleic anhydride functionalized elastomeric ethylene copolymer, a maleic anhydride functionalized ethylene,α-olefin copolymer, a terpolymer of ethylene, acrylic ester and maleic anhydride, a maleic anhydride grafted (MAH) polyolefin elastomer and combinations thereof.

DETAILED DESCRIPTION OF THE INVENTION

The present invention relates to a thermoplastic composition that comprises a polyamide resin, a polymer performance modifier and a silicone based additive. The resulting thermoplastic composition has an impact strength that is greater than the combination of the polyamide resin and polymer performance modifier alone and a tensile strength that is comparable the polyamide resin.

In an exemplary embodiment of the current invention, the thermoplastic composition comprises from about 25 to about 99 by weight percent of a polyamide resin; from about 1 to about 50 by weight percent of a polymer performance modifier; and about from 0.01 to about 25 by weight percent of a silicone based additive. Due to the high impact strength and low flexibility of the thermoplastic composition, molded articles comprising the thermoplastic composition are useful for many industrial applications. One preferred use is to create thermoplastic articles beneficial to the automotive industry.

Other uses of the current thermoplastic composition include, but are not limited to blow molded or injection molded applications, pneumatic duct work, pipes, tubing, chemical containers, gas tanks, fasteners and snap fit parts, hinged parts, gears and bearings, sporting goods, ski bearings, sprinkler heads, driving barrels, microcellular foam processing (i.e. Mucell® Technology), lawn mower parts or appliances.

In an exemplary embodiment of the current invention, the silicone based additive comprises an ultrahigh molecular weight siloxane polymer and may further comprise a binding agent. The ultrahigh molecular weight siloxane polymer is unfunctionalized and non-reactive with the polyamide resin. In addition, an unfunctionalized siloxane polymer cannot be considered as either a gel or an oil. Suitable binding agents for the silicone based additive include fumed silica. The silicone based additive may be provided in a pelletized silicone gum formulation. A commercially available formulation is sold under the name Genioplast® Pellet S by Wacker.

This thermoplastic composition exhibits the unexpected and remarkable finding that the impact performance of a thermoplastic composition containing a polyamide resin is greatly improved by the synergistic combination of a performance modifier and an ultrahigh molecular weight siloxane polymer. The thermoplastic composition of the present invention has been shown to undergo uniform deformation upon stress and loading. In addition, the thermoplastic composition of the present invention has improved impact resistance, toughness, low temperature ductility, fatigue resistance, wear resistance, resistance to necking, and elastic recovery. The thermoplastic composition of the present invention also provides high burst pressure and an improved surface appearance for glass filled resins.

This unforeseen behavior of siloxane polymer is believed to be due to its immobility in the continuous phase of the nylon composition, which allows it to evenly distribute throughout the thermoplastic composition. The high molecular weight nature prevents the siloxane polymer from migrating or diffusing to the surface, and eventually dissipating, that helps in dampening the impact energy in conjunction with the performance modifier. Gels or Oils, on the other hand, would tend to migrate to the surface because of very high diffusivity, especially at processing conditions. It has also been found that the silicone from the traditional silicone based additive blooms to the surface of the thermoplastic composition creating a non-uniform dispersion if the composition components.

It may be further desirable to increase the melt viscosity of the thermoplastic composition. In this fashion, a thermoplastic composition is provided comprising from about 50 to about 99 by weight percent of a polyamide resin; from about 1 to about 50 by weight percent of a polymer performance modifier; from 0.01 to about 25 by weight percent of a silicone based additive; and from about 0.1 to about 5.0 by weight of an olefin and maleic anhydride copolymer, wherein the an olefin and maleic anhydride copolymer has a molecular weight in the range of about 300 to about 1,000,000 and the ratio of olefin to maleic anhydride is 1:1. Suitable olefins include any such that are known in the art. In one exemplary embodiment of the current invention, the olefin is ethylene. A commercially available 1:1 copolymer of ethylene and maleic anhydride is sold under the name ZeMac® by Vertellus®. As described in Example 4, the shear viscosity can be increased to a range of about 1000 to about 2100 Pa when tested at a shear rate range from about 30 to about 100 sec. At this melt viscosity, the thermoplastic composition can be used for blow molding and pipe extrusion applications.

Suitable polyamide resins that may be used for the current invention include any known polyamides in the art. These include, but are not limited to: aliphatic, semicrystalline, aromatic or semiaromatic nylon resins. The nylon resins are those prepared from starting materials of essentially a lactam or a diamine, and an aliphatic, semiaromatic or aromatic dicarboxylic acid. Suitable lactams include caprolactam and laurolactam. Suitable amines include tetramethylenediamine, hexamethylenediamine (HMD), 2-methylpentamethylenediamine, undecamethylenediamine, dodecamethylenediamine, 2,2,4-/2,4,4-trimethylhexamethylenediamine, 5-methylnonamethylenediamine, metaxylylenediamine (MXD), paraxylylenediamine and 2-Methyl-1,5-pentamethylenediamine (MPMD). Suitable dicarboxylic acids include those such as: adipic acid, suberic acid, azelaic acid, sebacic acid, dodecanedioic acid (DDDA), terephthalic acid (TPA), isophthalic acid (IPA), 2-chloroterephthalic acid, 2-methylterephthalic acid, 5-methylisophthalic acid, 5-sodium-sulfoisophthalic acid, hexahydroterephthalic acid and hexahydroisophthalic acid. In the invention, nylon homopolymers or copolymers to be derived from those starting materials are used either singly or as their mixtures.

Specific examples of polyamide resins that are desirable for thermoplastic compositions of the subject disclosure, are: (nylon 6), polyundecanamide (nylon 11), polylauramide (nylon 12), polyhexamethylenadipamide (nylon 66), polytetramethylenadipamide (nylon 46), polyhexamethylenesebacamide (nylon 610), polyhexamethylenedodecamide (nylon 612), polyhexamethyleneterephthalamide (6T), polyhexamethylenisophthalamide (6I), 2-methylpentamethylene terephthalamide (DT), 2-methylpentamethylene isophthalamide (DI), polyhexamethyleneterephthalamide/polycapramide copolymer (nylon 6T/6), polyhexamethyleneterephthalamide/polydodecanamide copolymer (nylon 6T/12), polyhexamethylenadipamide/polyhexamethyleneterephthalamide copolymer (nylon 66/6T), polyhexamethylenadipamide/polyhexamethylenisophthalamide copolymer (nylon 66/6I), polyhexamethylenadipamide/polyhexamethylenisophthalamide/-polycapramide copolymer (nylon 66/6I/6), polyhexamethylenadipamide/polyhexamethyleneterephthalamide/polyhexamethylenisophthalamide copolymer (nylon 66/6T/6I), polyhexamethyleneterephthalamide/-polyhexamethylenisophthalamide copolymer (nylon 6T/6I), polyhexamethyleneterephthalamide/poly(2-methylpentamethylene)terephthalamide copolymer (nylon 6T/M5T), polyhexamethyleneterephthalamide/-polyhexamethylenesebacamide/polycapramide copolymer (nylon 6T/610/6), polyhexamethyleneterephthalamide/polydodecanamide/-polyhexamethylenadipamide copolymer (nylon 6T/12/66), polyhexamethyleneterephthalamide/polydodecanamide/-polyhexamethylenisophthalamide copolymer (nylon 6T/12/6I), poly m-xylylenadipamide (nylon MXD6), as well as their mixtures and copolymers, etc.

Especially preferred are nylon resins suitable for the current invention are Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6I, Nylon DT, Nylon DI, Nylon MXD-6 and combinations or copolymers thereof. In another exemplary embodiment of the current invention the polyamide resin is Nylon 6,6.

The thermoplastic compositions taught herewith each exhibit an strength value which is greater than the combination of the polyamide resin and the polymer performance modifier or the combination of the polyamide resin and the silicone based additive. In addition, the thermoplastic composition has an ultimate tensile strength that is at least 80% that of the combination of the polyamide resin and the polymer performance modifier.

Suitable polymer performance modifiers include those known in the art that impart improved impact strength when combined with polyamide resins. U.S. Pat. Nos. 4,346,194, 6,579,581 and 7,671,127, herein incorporated by reference, teach nylon resins with impact modifying components. In an exemplary embodiment of the current invention the polymer modifier comprises an elastomeric polyolefinic polymer functionalized with an unsaturated carboxylic acid anhydride.

Suitable elastomers are polymers or copolymers of ethylene and other α-olefins or copolymers of α-olefins with alkyl acrylate, acrylic ester or alkyl methacrylate. Other suitable elastomers include styrene-butadiene di-block copolymers (SB), styrene-butadiene-styrene tri-block copolymers (SBS), styrene-isoprene-styrene tri-block copolymers (SIS) and hydrogenated styrene-ethene/butene-styrene tri-block copolymers (SEBS). Other elastomers that may be used include terpolymers of ethylene, propylene, and diene monomers (EPDM rubber). As used herein, the term "α-olefins" or alpha-olefins refer to olefins or alkenes with a chemical formula $C_xH_{2x}$, wherein they have a double bond at the primary or alpha (α) position.

Suitable functional groups include carboxylic acid groups, carboxylic anhydride groups, carboxylic ester groups, carboxamide groups, carboximide groups, amino groups, hydroxy groups, epoxy groups, urethane groups, and oxazoline groups. Examples of suitable monomers for introducing the functional groups are maleic anhydride, itaconic acid, acrylic acid, glycidyl acrylate, and glycidyl methacrylate.

Suitable polymer performance modifiers are commercially available, such as that sold by Dow® under the name Amplify™ GR216 which is a maleic anhydride functionalized polyolefin elastomer. Another suitable commercially available polymer performance modifier is sold by Arkema® under the name Lotader® 4700 and is a random terpolymer of ethylene, ethyl acrylate and maleic anhydride. Yet another suitable commercially available polymer performance modifier is sold by ExxonMobil® under the name Exxelor™ VA 1840 and is a semi-crystalline ethylene copolymer functionalized with maleic anhydride. Yet further, another suitable commercially available performance modifier is sold by Arkema® under the name Orevac® IM300 and is a maleic anhydride modified low-density polyethylene. Other polymer performance modifiers are commonly used.

The thermoplastic composition of the current invention may further comprise additives such as lubricants, glass fillers, mineral fillers, plasticizers, pigments, dyes, antioxidants, heat stabilizers, hydrolysis stabilizers, nucleating agents, flame retardants, blowing agents and combinations thereof. Suitable mineral fillers can be selected from the group consisting of kaolin, clay, talc, and wollastonite, diatominte, titanium dioxide, mica, amorphous silica and combinations thereof. Suitable glass fillers are selected from the group consisting of short glass fiber, long glass fiber, continuous glass fiber, glass flakes, glass beads and combinations thereof. As used herein, short glass fiber refer to chopped glass fibers and glass fiber that is 3.175 mm or shorter in length. Long glass fibers have a length greater than 3.175 mm in length. As used herein, continuous glass fiber refer to glass rovings. The glass fibers may also be coated with a sizing composition and organosilane coupling agents to provide hydrolysis resistance. Suitable coated glass fibers are taught in U.S. Pat. Nos. 6,207,737, 6,846,855, 7,419,721 and 7,732,047, which are herein incorporated by reference. Suitable heat stabilizers are selected from the group consisting of hindered phenols, amine antioxidants, hindered amine light stabilizers (HALS), aryl amines, phosphorus based antioxidants, copper heat stabilizers, polyhydric alcohols, tripentaerythritol, dipentaerythritol, pentaerythritol and combinations thereof.

In one exemplary embodiment, the thermoplastic composition of the current invention is formed by adding a polymer performance modifier and a silicone based additive comprising an ultrahigh molecular weight siloxane polymer additive to a polyamide resin and mixing the polymer performance modifier, silicone based additive and polyamide resin to form a high impact polymer. The high impact polymer has an ultimate tensile strength that is at least 80% that of the combination of the polyamide resin and polymer performance modifier. Suitable equipment for blending the polyamide resin, siloxane polymer and performance modifier include a twin-screw extruder, melt kneader or batch mixer. The thermoplastic composition is suitable for compounding or for use as a masterbatch.

In preferred embodiments the polymer performance modifier comprises a maleic anhydride functionalized elastomeric ethylene copolymer, a maleic anhydride functionalized ethylene,α-olefin copolymer, a terpolymer of ethylene, acrylic ester and maleic anhydride, a maleic anhydride grafted (MAH) polyolefin elastomer or combinations thereof. In a preferred embodiment of this process, the polyamide resin is Nylon 6,6.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

EXAMPLES

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and non-limiting.

Comparative Example 1

TABLE 1

|  | Control Nylon 66 (Average Values) |
| --- | --- |
| Tensile Strength @ yield, Mpa | 47-50 |
| Strain @ yield, % | 4.4 |
| Strain @ break, % | 34.2 |
| Ten Mod, Mpa | 1940-2000 |
| R.T. Notched Charpy. kJ/m2 | 76 |

Table 1 shows the strength characteristics for INVISTA formulation nylon resin that contains 42-65% by weight of nylon 6,6 composition having a copper iodide heat stabilizer and an aluminum stearate lubricant. The resin also contains 22% of a polymer performance modifier of ethylene copolymer functionalized with maleic anhydride (i.e.: Exxelor™ VA1840) and no silicon based additive.

Example 1

TABLE 2

|  | 1<br>A | 2<br>B | 3<br>C | 4<br>D | 5<br>E | 6<br>F | 7<br>G | 8<br>H | 9<br>J | 10<br>K | 11<br>L | 12<br>M |
| --- | --- | --- | --- | --- | --- | --- | --- | --- | --- | --- | --- | --- |
| Nylon 66 | 81.47 | 79.47 | 77.47 | 79.47 | 77.47 | 75.47 | 77.47 | 75.47 | 73.47 | 75.47 | 73.47 | 71.47 |
| Exxelor VA1840 | 16 | 16 | 16 | 18 | 18 | 18 | 20 | 20 | 20 | 22 | 22 | 22 |
| Shepherd 8:1:1 HS | 0.33 | 0.33 | 0.33 | 0.33 | 0.33 | 0.33 | 0.33 | 0.33 | 0.33 | 0.33 | 0.33 | 0.33 |
| CNH-00509 | 1 | 1 | 1 | 1 | 1 | 1 | 1 | 1 | 1 | 1 | 1 | 1 |
| UHMW Si | 1 | 3 | 5 | 1 | 3 | 5 | 1 | 3 | 5 | 1 | 3 | 5 |
| Al Stearate | 0.2 | 0.2 | 0.2 | 0.2 | 0.2 | 0.2 | 0.2 | 0.2 | 0.2 | 0.2 | 0.2 | 0.2 |
| Total | 100 | 100 | 100 | 100 | 100 | 100 | 100 | 100 | 100 | 100 | 100 | 100 |
| Notched Charpy, kJ/m2 at R.T. | 48.4 | 72.3 | 79.2 | 68.1 | 83.2 | 98.8 | 80.7 | 90.7 | 96.4 | 90.3 | 98.6 | 103.1 |
| Notched Charpy, kJ/m2 at −40 C. | 14.4 | 17.3 | 19.6 | 14.9 | 20.6 | 19.65 | 19.1 | 23.06 | 44.7 | 20.7 | 26.6 | 69.7 |
| TS @ yield, Mpa | 56.7 | 53 | 50.4 | 53.3 | 50 | 47.7 | 50.5 | 47.7 | 45.5 | 48.3 | 45.2 | 43.4 |
| Strain @ yield, % | 5.4 | 5.5 | 5.9 | 6.4 | 6.2 | 5.8 | 6.6 | 6.7 | 9.4 | 6.8 | 10 | 29 |
| Strain @ break, % | 21.6 | 35.7 | 35.4 | 26.2 | 38.6 | 42.6 | 31 | 36.3 | 50.3 | 32.7 | 42 | 61 |
| Ten Mod, Mpa | 2117 | 2320 | 1990 | 2046 | 2005 | 1918 | 2255 | 1934 | 1941 | 1995 | 1827 | 2389 |

Figure 1:
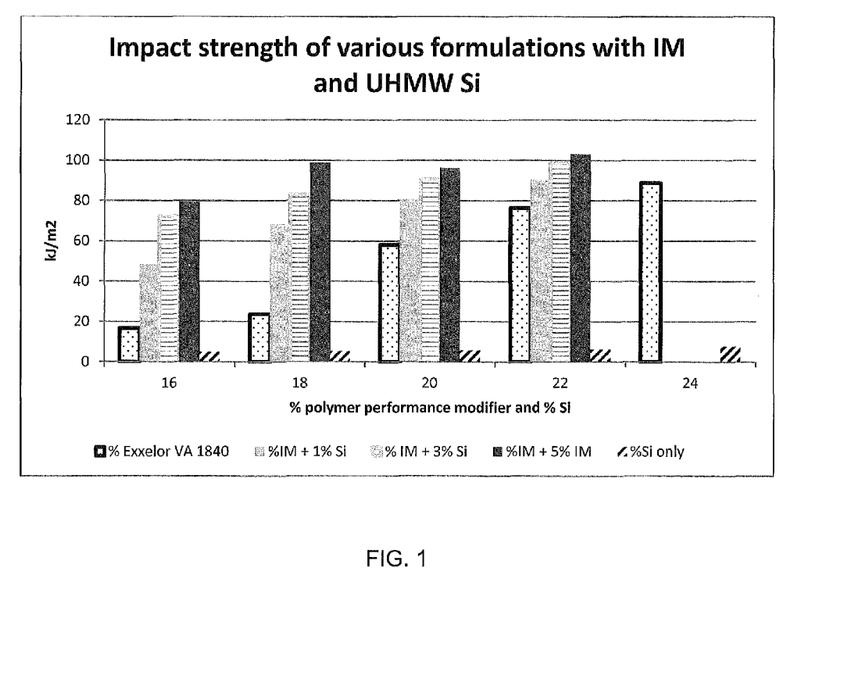
FIG. 1 is a chart summarizing the impact strength of unreinforced nylon 6,6 resin with various amounts of a polymer performance modifier and a silicone based additive.

Table 2 summarizes the results from adding various amounts of a silicone based additive and polymer performance polymer additive to INVISTA formulation unreinforced nylon 6,6 resin. The silicone based additive added was pelletized silicone gum formulation sold under the name Genioplast® Pellet S by Wacker. The pellets contain about 65% by weight of ultra high molecular weight siloxane gum content. The polymer performance polymer additive was an ethylene copolymer functionalized with maleic anhydride sold by ExxonMobil® under the name Exxelor™ VA 1840. The results show that high level tough impact properties are achieved without sacrificing other properties such as flexural properties, tensile strength, modulus surface finish and tribology. For example, at room temperature (R.T.) and at 16% impact modifier and 5% siloxane gum loading an impact strength of 79.2 Kj/m2 and tensile strength of 50.5 Mpa was achieved. This is a significant increase from the impact strength from the comparative example at the same polymer performance modifier level (16.8 Kj/m2). In fact, the impact strength still remains higher than when the comparative example has an polymer performance modifier level of 22% (76.4 Kj/m2). FIG. 1 summarizes the comparison of the impact strength of the unreinforced INVISTA formulation nylon 6,6 resin at various loadings of Genioplast® Pellet S and Exxelor™ VA 1840 (tested at R.T.). As shown in FIG. 1, when the polymer performance modifier is present at about 16% by weight and the silicone based additive is present in an amount from about 1.0% to about 5.0% by weight, the impact strength is at least about 70 kJ/m2 when tested at room temperature. In addition, when the polymer performance modifier is present in an amount from about 18% to about 22% by weight and the silicone based additive is present in an amount from about 1.0% to about 5.0% by weight, the impact strength is at least about 80 kJ/m2 when tested at room temperature. In addition, the tensile strength of the sample remained substantially the same. It was shown that the tensile strength of the samples at various siloxane gum remained within 80% of that of the resin from the comparative example.

Example 2

Figure 2:
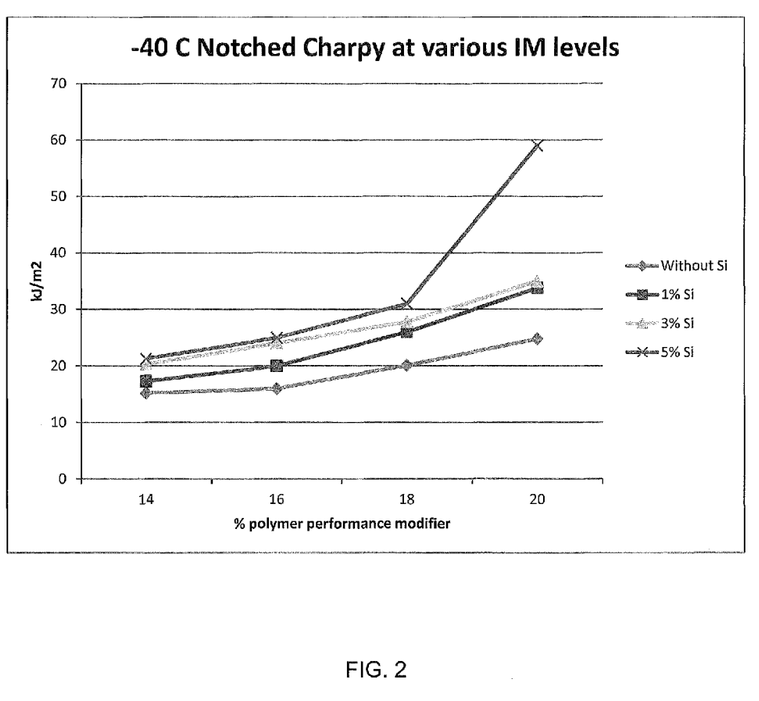
FIG. 2 is a chart summarizing the impact strength of unreinforced nylon 6,6 resin with various amounts of a polymer performance modifier and a silicone based additive tested at −40° C.
Figure 3:
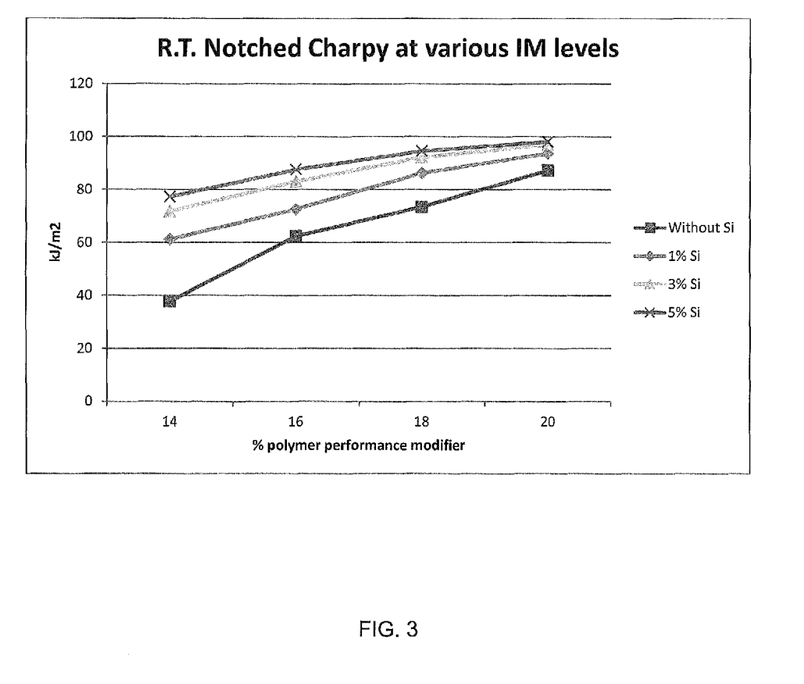
FIG. 3 is a chart summarizing the impact strength of unreinforced nylon 6,6 resin with various amounts of a polymer performance modifier and a silicone based additive tested at room temperature.

FIG. 2 and FIG. 3 show samples of INVISTA formulation unreinforced nylon 6,6 resin that are combined with various amounts of silicone based additive and a polymer performance modifier. FIG. 2 shows the results at −40° C. and FIG. 3 shows the results at room temperature (R.T.). The silicone based additives were Genioplast® pellets. The polymer performance modifier was a maleic anhydride polyolefin elastomer sold by Dow® under the name Amplify™ GR 216. FIGS. 2 and 3 both show that a significant increase in impact strength greater can be achieved using the combination of the polymer performance modifier and siloxane gum additive. As shown in FIG. 2, when the polymer performance modifier is present in an amount from about 16% to about 22% by weight and the silicone based additive is present in an amount from about 1.0% to about 5.0% by weight, the impact strength is at least about 20 kJ/m2 when tested at −40° C.

Example 3

Figure 4:
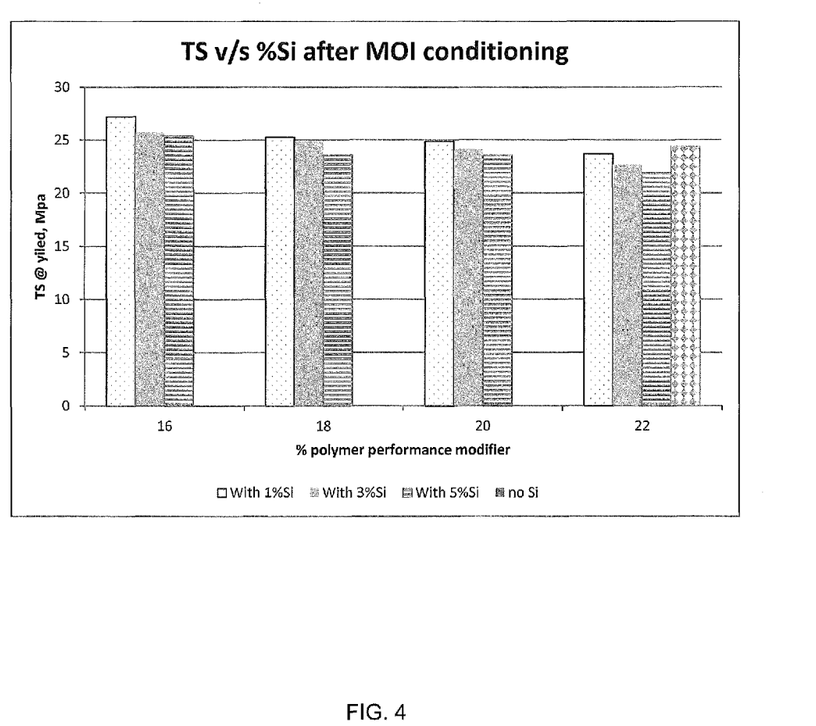
FIG. 4 is a chart summarizing the tensile strength of unreinforced nylon 6,6 resin with various amounts of a polymer performance modifier and a silicone based additive tested after moisture conditioning.

FIG. 4 shows samples of INVISTA formulation unreinforced nylon 6,6 resin that are combined with various amounts of silicone based additive and a polymer performance modifier. The silicone based additives were Genioplast® pellets. The polymer performance polymer additive was an ethylene copolymer functionalized with maleic anhydride sold by ExxonMobil® under the name Exxelor™ VA 1840. The specimens were conditioned in saturated moisture at 80° C. for 17 days in a closed container to achieve 100% saturation. The results are summarized in Table 3. As can be seen the tensile strength of the samples with 22% polymer performance modifier (21.9-23.7 Mpa) is well within 80% of the tensile strength of the sample with no silicone based additive (24.4 Mpa). FIG. 4 shows the tensile strength of the samples when tested at 50% elongation. In addition, no break was observed in the samples when tested at 200% elongation.

TABLE 3

| Sample RB-041 | % Exxelor VA 1840 | % IMD additive | Wt of specimen after conditioning in closed box at 80 deg C./ 17 day (gms) | Wt of DAM specimen, gms | % MOI absorbed @ 80 C. for 17 days (100% RH) | TS @ yield, Mpa | % Strain @ yield | % Strain @ break |
|---|---|---|---|---|---|---|---|---|
| A | 16 | 1 | 10.3214 | 9.8046 | 5.28 | 27.2 | 50 | no break @ 200% |
| B | 16 | 3 | 10.4348 | 9.832 | 6.14 | 25.7 | 50 | no break @ 200% |
| C | 16 | 5 | 10.3537 | 9.7574 | 6.12 | 25.4 | 50 | no break @ 200% |
| D | 18 | 1 | 10.2841 | 9.6958 | 6.07 | 25.3 | 50 | no break @ 200% |
| E | 18 | 3 | 10.1927 | 9.6935 | 5.15 | 24.9 | 50 | no break @ 200% |
| F | 18 | 5 | 10.2734 | 9.6823 | 6.11 | 23.6 | 50 | no break @ 200% |
| G | 20 | 1 | 10.1459 | 9.6285 | 5.38 | 24.9 | 50 | no break @ 200% |
| H | 20 | 3 | 10.1685 | 9.6507 | 5.37 | 24.1 | 50 | no break @ 200% |
| J | 20 | 5 | 10.1585 | 9.6374 | 5.41 | 23.6 | 50 | no break @ 200% |
| K | 22 | 1 | 10.188 | 9.6219 | 5.89 | 23.7 | 50 | no break @ 200% |
| L | 22 | 3 | 10.0919 | 9.5358 | 5.84 | 22.7 | 50 | no break @ 200% |
| M | 22 | 5 | 10.067 | 9.5174 | 5.78 | 21.9 | 50 | no break @ 200% |

TABLE 3-continued

| Sample RB-041 | % Exxelor VA 1840 | % IMD additive | Wt of specimen after conditioning in closed box at 80 deg C./ 17 day (gms) | Wt of DAM specimen, gms | % MOI absorbed @ 80 C. for 17 days (100% RH) | TS @ yield, Mpa | % Strain @ yield | % Strain @ break |
|---|---|---|---|---|---|---|---|---|
| F11-0111 ACS Lot | 22 | 0 | 10.0517 | 9.4942 | 5.88 | 24.4 | 50 | no break @ 200% |

Example 4

Example 4 exhibits how the melt viscosity of the thermoplastic composition can be increased with the addition of a copolymer of ethylene and maleic anhydride. Table 4 compares the melt viscosity, which is tested by measuring the shear viscosity, of various resins. Sample 1 is an INVISTA formulation unreinforced nylon 6,6 resin that is combined with a silicone based additive and a polymer performance modifier. Sample 2 is an INVISTA formulation unreinforced nylon 6,6 resin that is combined with a silicone based additive, a polymer performance modifier and a 1:1 copolymer of ethylene and maleic anhydride. The silicone based additives were Genioplast® pellets. The polymer performance polymer additive was an ethylene copolymer functionalized with maleic anhydride sold by ExxonMobil® under the name Exxelor™ VA 1840. The 1:1 copolymer of ethylene and maleic anhydride is sold by Vertellus® under the name ZeMac®. Sample 3 is a comparative example showing the melt viscosity of a high density polyethylene (HDPE) resin. The shear viscosity was measured using a capillary rheometer at various shear rates. As shown in Table 4 below, the shear viscosity (and correspondingly the Melt Viscosity) of Sample 2 showed a significant increase over Sample 1 at lower shear rates.

TABLE 4

|  | Sample 1 B | Sample 2 G | Sample 3 HDPE (180 C.) |
|---|---|---|---|
| Nylon 6,6 | 70 | 69 |  |
| Exxelor VA 1840 | 22 | 22 |  |
| ZeMac 60 |  | 1 |  |
| Wacker Pellet S | 5 | 5 |  |
| Cu based Heat Stabilizer | 0.3 | 0.3 |  |
| phenolic antioxidants | 0.5 | 0.5 |  |
| Carbon Black | 2 | 2 |  |
| Zn Stearate | 0.2 | 0.2 |  |
| Total | 100 | 100 |  |
| Shear Rate (sec −1) | Shear Viscosity (Pa) | | |
| 10040.2 | 30.5 | 43.5 | 35.1 |
| 5020.1 | 47.3 | 73.0 | 60.7 |
| 4016.0 | 53.1 | 85.7 | 69.7 |
| 3011.0 | 63.8 | 104.1 | 90.5 |
| 2006.6 | 79.7 | 136.8 | 121.9 |
| 1001.8 | 113.3 | 221.0 | 180.8 |
| 499.7 | 159.4 | 362.5 | 310.7 |
| 296.3 | 200.3 | 525.3 | 454.2 |
| 148.2 | 273.2 | 827.5 | 807.7 |
| 100.0 | 325.5 | 1052.3 | 1180.1 |
| 50.0 | 461.0 | 1480.5 | 1900.3 |
| 30.0 | 584.2 | 2062.8 | 2597.4 |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or ±10%, of the numerical value(s) being modified. In addition, the phrase "about 'x' to 'y'" includes "about 'x' to about 'y'".

While the illustrative embodiments of the invention have been described with particularity, it will be understood that the invention is capable of other and different embodiments and that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the invention pertains.

What is claimed:

1. A thermoplastic composition comprising from about 50 to about 99 by weight percent of a polyamide resin; from about 1 to about 50 by weight percent of a polymer performance modifier; and from about 0.01 to about 25 by weight percent of a pelletized silicone based additive.

2. The thermoplastic composition of claim 1 wherein the thermoplastic composition has an impact strength value which is greater than the combination of the polyamide resin and the polymer performance modifier or the combination of the polyamide resin and the pelletized silicone based additive.

3. The thermoplastic composition of claim 1 wherein the thermoplastic composition has an ultimate tensile strength that is at least 80% of that of the combination of the polyamide resin and the polymer performance modifier.

4. The thermoplastic composition of claim 1 wherein the pelletized silicone based additive comprises an ultrahigh molecular weight siloxane polymer.

5. The thermoplastic composition of claim 4 wherein the ultrahigh molecular weight siloxane polymer is unfunctionalized and non-reactive with the polyamide resin.

6. The thermoplastic composition of claim 1 wherein the polymer performance modifier comprises an impact modifier.

7. The thermoplastic composition of claim 6 wherein the impact modifier is an elastomeric polyolefinic polymer functionalized with an unsaturated carboxylic acid anhydride.

8. The thermoplastic composition of claim 6 wherein the impact modifier is selected from a group consisting of a maleic anhydride functionalized elastomeric ethylene copolymer, a maleic anhydride functionalized ethylene, a-olefin copolymer, a terpolymer of ethylene, acrylic ester and maleic anhydride, a maleic anhydride grafted (MAH) polyolefin elastomer and combinations thereof.

9. The thermoplastic composition of claim 1 further comprising a heat stabilizer.

10. The thermoplastic composition of claim 9 wherein the heat stabilizer is selected from the group consisting of hindered phenols, amine antioxidants, hindered amine light stabilizers (HALS), aryl amines, phosphorus based antioxidants, copper heat stabilizers, polyhydric alcohols, tripentaerythritol, dipentaerythritol, pentaerythritol and combinations thereof.

11. The thermoplastic composition of claim 1 wherein the polyamide resin is selected from a group consisting of Nylon 6, Nylon 6,6, Nylon 6,12, Nylon 4,6, Nylon 6,10, Nylon 7, Nylon 10, Nylon 10, 10, Nylon 12, Nylon 12, 12, Nylon 6T, Nylon 6I, Nylon DT, Nylon DI, Nylon 6T/6I, Nylon 6T/DT, Nylon 6/6,6, Nylon DT/DI, Nylon MXD-6 and blends and copolymers thereof.

12. The thermoplastic composition of claim 1 wherein the pelletized silicone based additive is evenly distributed throughout the thermoplastic composition.

13. The thermoplastic composition of claim 1 further comprising from about 0.1 to about 5.0 by weight of an olefin and maleic anhydride copolymer, wherein the olefin and maleic anhydride copolymer has a molecular weight in the range of about 300 to about 1,000,000 and the ratio of olefin to maleic anhydride is 1:1.

14. The thermoplastic composition of claim 13 wherein the olefin is ethylene.

15. The thermoplastic composition of claim 13 wherein the shear viscosity is greater than 1000 Pa when tested at a shear rate of 100 $\sec^{-1}$.

16. The thermoplastic composition of claim 13 wherein the shear viscosity is greater than 2000 Pa when tested at a shear rate of 30 $\sec^{--}$.

17. The thermoplastic composition of claim 1 wherein the polymer performance modifier is present in an amount from about 16% to about 22% by weight and the pelletized silicone based additive is present in an amount from about 1.0% to about 5.0% by weight, wherein the impact strength is at least 20 kJ/m$^2$ when tested at −40° C.

18. The thermoplastic composition of claim 1 wherein the polymer performance modifier is present at about 16% by weight and the pelletized silicone based additive is present in an amount from about 1.0% to about 5.0% by weight, wherein the impact strength is at least 70 kJ/m$^2$ when tested at room temperature.

19. The thermoplastic composition of claim 1 wherein the polymer performance modifier is present in an amount from about 18% to about 22% by weight and the pelletized silicone based additive is present in an amount from about 1.0% to about 5.0% by weight, wherein the impact strength is at least 80 kJ/m$^2$ when tested at room temperature.

20. The thermoplastic composition of claim 1 wherein the polymer performance modifier is present at about 16% to about 22% by weight and the pelletized silicone based additive is present in an amount from about 1.0% to about 5.0% by weight, wherein the tensile strength is at least 20 Mpa at 50% elongation when tested at 100% moisture saturation.

21. The thermoplastic composition of claim 1 wherein the polymer performance modifier is present at about 16% to about 22% by weight and the pelletized silicone based additive is present in an amount from about 1.0% to about 5.0% by weight, wherein no break was observed at 200% elongation when tested at 100% moisture saturation.

22. A molded article comprising the thermoplastic composition of claim 1.

23. A process for forming the thermoplastic composition of claim 1 comprising the steps of adding a polymer performance modifier and a pelletized silicone based additive to a polyamide resin and mixing the polymer modifier, silicone based additive and polyamide resin to form a high impact polymer.

24. The process of claim 23 wherein the polymer performance modifier comprises an impact modifier selected from the group consisting of a maleic anhydride functionalized elastomeric ethylene copolymer, a maleic anhydride functionalized ethylene, a-olefin copolymer, a terpolymer of ethylene, acrylic ester and maleic anhydride, a maleic anhydride grafted (MAH) polyolefin elastomer and combinations thereof.

25. The process of claim 23 wherein the polyamide resin is Nylon 6,6.

* * * * *